(12) United States Patent
Pokorny et al.

(10) Patent No.: US 7,491,441 B2
(45) Date of Patent: Feb. 17, 2009

(54) HIGH REFRACTIVE INDEX, DURABLE HARD COATS

(75) Inventors: Richard J. Pokorny, Maplewood, MN (US); Roger A. Mader, Stillwater, MN (US); David B. Olson, Marine on St. Croix, MN (US); Brant U. Kolb, Afton, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 763 days.

(21) Appl. No.: 11/026,573

(22) Filed: Dec. 30, 2004

(65) Prior Publication Data

US 2006/0147702 A1 Jul. 6, 2006

(51) Int. Cl.
  B32B 5/16 (2006.01)
  B32B 27/30 (2006.01)
  C08K 3/22 (2006.01)
(52) U.S. Cl. .................. 428/328; 428/323; 524/413
(58) Field of Classification Search .................. None
  See application file for complete search history.

(56) References Cited

U.S. PATENT DOCUMENTS

| | | | |
|---|---|---|---|
| 4,396,476 | A | 8/1983 | Roemer et al. |
| 5,677,050 | A | 10/1997 | Bilkadi et al. |
| 6,005,137 | A | 12/1999 | Moore et al. |
| 6,277,485 | B1 | 8/2001 | Invie et al. |
| 6,376,590 | B2 | 4/2002 | Kolb et al. |
| 6,416,838 | B1 | 7/2002 | Arney et al. |
| 6,653,425 | B1 | 11/2003 | Armstrong-Poston et al. |
| 6,656,258 | B2 | 12/2003 | Elsbernd et al. |
| 6,660,388 | B2 | 12/2003 | Liu et al. |
| 6,663,978 | B1 | 12/2003 | Olson et al. |
| 6,677,028 | B1 | 1/2004 | Lasch et al. |
| 6,680,125 | B1 | 1/2004 | Sasaki |
| 6,706,403 | B1 | 3/2004 | Olofson et al. |
| 6,716,891 | B1 | 4/2004 | Meisenburg et al. |
| 6,760,157 | B1 | 7/2004 | Allen et al. |
| 6,777,070 | B1 | 8/2004 | Murata et al. |
| 6,778,753 | B2 | 8/2004 | Blomquist |
| 6,788,463 | B2 | 9/2004 | Merrill et al. |
| 6,800,378 | B2 | 10/2004 | Hawa et al. |
| 6,818,680 | B2 | 11/2004 | Shustack |

(Continued)

FOREIGN PATENT DOCUMENTS

EP 0339880 8/1993

(Continued)

OTHER PUBLICATIONS

Park, Jong Hyeok et al., White Emission From Polymer/Quantum Dot Ternary Nanocomposites by Incomplete Energy Transfer, Nanotechnology, vol. 15, No. 9, Sep. 2004, pp. 1217-1220.

*Primary Examiner*—Monique R Jackson
(74) *Attorney, Agent, or Firm*—Carolyn A. Fischer (57) ABSTRACT

The development of new compositions and new aromatic sulfur acrylate monomers results in improved hardcoat films, and improved optical films that contain the hard coat films. The films provide improved display systems when incorporated thereon. The combination of functionalized zirconia nanoparticles with multifunctional acrylate crosslinkers and high index of refraction aromatic sulfur acrylates, about 1.58 or greater, produces abrasion resistant hard coats that have relatively high refractive indices.

12 Claims, 3 Drawing Sheets

U.S. PATENT DOCUMENTS

| | | |
|---|---|---|
| 2002/0001710 A1 | 1/2002 | Kang et al. |
| 2002/0123589 A1 | 9/2002 | Olson et al. |
| 2003/0105189 A1 | 6/2003 | Yashiro et al. |
| 2003/0224250 A1 | 12/2003 | Setthachayanon et al. |
| 2005/0136252 A1 | 6/2005 | Chisholm et al. |
| 2005/0267230 A1* | 12/2005 | Esaki et al. ............ 522/172 |

FOREIGN PATENT DOCUMENTS

| | | |
|---|---|---|
| EP | 1014113 | 6/2000 |
| JP | 04077467 A * | 3/1992 |
| JP | 05215902 | 8/1993 |
| JP | 08034768 | 2/1996 |
| JP | 2002-293762 | 10/2002 |
| JP | 2004-272197 | 9/2004 |
| WO | WO 2006/007286 | 1/2006 |

* cited by examiner

HIGH REFRACTIVE INDEX, DURABLE HARD COATS

BACKGROUND OF THE INVENTION

The development of films or coatings as protective films for display devices such as a CRT screen is well documented in the art. These include antireflective coatings, hardcoats, optical coatings, and the like. Nevertheless, there continues to be a need for further improvement in the development of polymerizable high index materials for optical applications. Exemplary applications include antireflective coatings, hardcoats, and other film materials. Many polymerizable films have a refractive index of 1.5 or less. Because of the optical advantages, however, an increase of the refractive index to 1.58 or more, and more preferably 1.6 or more, would be a desirable improvement. Furthermore, there is a need for durable, inexpensive, and yet high quality antireflective coatings that exhibit relatively higher refractive indices. The development of hard coat compositions having refractive indices of 1.58 or higher would facilitate a reduced cost of manufacturing, a reduction in raw material costs, and would also provide non-fringing hard coats on desirable substrates such as polyethylene terephthalate (PET).

SUMMARY OF THE INVENTION

The above-referenced concerns are resolved by the development of new compositions resulting in improved hardcoat films, and improved optical films that contain the hard coat films. It has been discovered that the combination of functionalized zirconia nanoparticles with multifunctional acrylate crosslinkers and high index of refraction aromatic sulfur acrylates, about 1.58 R.I. or greater, produces abrasion resistant hard coats that have relatively high refractive indices.

Stated another way, the present invention includes ultraviolet curable compositions containing discrete, crystalline zirconia nanoparticles with reactive, or copolymerizable, surface modification, in a polymerizable high index of refraction acrylate matrix. It is believed that copolymerizable surface modification provides a functional group that enables the functionalized particle to co-polymerize with the reactive monomers and crosslinkers in the formulation. Relative to surface modifying nanoparticles, acrylate functionality is preferred over methacrylate functionality. On the other hand, methacrylate functionality is preferred over non-reactive, or nonpolymerizable, functionality. As the nanocomposite cures, the resultant network is heavily crosslinked by selection of raw materials with substantial acrylate functionality.

DETAILED DESCRIPTION

The present invention includes compositions containing acrylate and/or methacrylate functional molecules. Accordingly, "acrylic" is defined as including both acrylate and/or methacrylate functional molecules. More specifically, the present invention includes compositions containing an aromatic sulfur acrylate monomer. An "aromatic sulfur acrylate monomer" is defined as an acrylic functional monomer that includes aromatic functionality with at least one divalent sulfur atom bound to the aromatic group.

Stated another way, the radiation curable compositions of the present invention must include one or more high index of refraction aromatic sulfur acrylate monomers wherein each monomer contains at least two rings comprising one or more aromatic structures, biphenyl or naphthalenic for example. Stated another way, the novel thio aromatic acrylate monomers of the present invention preferably contain a naphthalenic group or more than one aromatic group. Or, the thio aromatic acrylate monomers of the present invention will exhibit a refractive index of 1.55 or more, and more preferably 1.58 or more.

One potentially useful set of such monomeric molecules is described by the following formulae, as integrated within various optical coatings described herein, and as applied to display systems, for example.

$R3 = (CH_2)_x$ where $x = 2-8$ and $R4 = H$ or $CH_3$ $R3 = (CH_2)_x$ where $x = 2-8$ and $R4 = H$ or $CH_3$ Exemplary molecules as illustrated above are described in Examples 11 and 12.

Another potentially useful set of such high index of refraction aryl sulfur acrylate monomer molecules are described by the following formula.

where $R1=H$, $CH_3$; $m, n, p, q$ are independently 1-6; Ar is any aromatic group.

Exemplary molecules as illustrated above are described in Example 1. The molecules described by Examples 1b, 1d, and 12, or structures numbered as 2, 4, and 11, exemplify the novel high index aromatic sulfur acrylates of the present invention. Novel molecules of the present invention can be further characterized as naphthalenic sulfur acrylates, and, multi-aromatic, multi-acrylate sulfur acrylates as defined by the naphthalenic structure given above and the multi-aromatic and multi-acrylate structure given directly above. Polymerizable compositions incorporating the naphthalenic structure given above and the multi-aromatic and multi-acrylate structure given directly above are believed to be novel in that compositions incorporating molecules of these types exhibit relatively higher refractive indices and also relatively higher durability as shown in the data presented herein.

Compositions of the present invention may be characterized as nanocomposites. Nanocomposites are defined as a polymer matrix that contains well-dispersed nanoparticles. Nanoparticles are defined as particles that are smaller than 200 nanometers and often smaller than 100 nm. U.S. Pat. No.5,385,776 exemplifies the current understanding of nanocomposites incorporated within polyamides and is herein incorporated by reference. A nanoparticle is generally an inorganic particle such as a metal, metal oxide, metal nitride, metal carbide or metal chloride. In accordance with the present invention, the use of high index nanoparticles increases the refractive index of compositions incorporating the same. Preferred nanoparticles include crystalline zirconia, although other high index nanoparticles such as titania, antimony, mixtures of metal oxides, and mixed metal oxides are acceptable. Crystalline zirconia is preferred over amorphous zirconia due to the greater refractive index of compositions containing crystalline zirconia. Functionalized silica nanoparticles may be added to the zirconia based compositions for added reinforcement and abrasion resistance of the finished coating. Examples of useful zirconia are those described in U.S. Pat. No. 6,376,590, and examples of titania are described in U.S. Pat. No. 6,432,526, both incorporated by reference in their entirety. Zirconia particles may be supplied by NALCO and BUHLER, for example. The preferred weight percent range of functionalized zirconia is from 25 to 75%, and more preferably from 40 to 60%. If desired, silica nanoparticles may be employed to complement the total zirconia nanoparticles in the weight percent range given. In further accordance with the present invention, a relatively small percentage of relatively larger particles, but still less than one micron in size, may be included in the present compositions. Because the percentage is low, the use of larger particles of relatively high or low index is included.

The present invention may be distinguished from matte particles. The use of matte coatings as optical films is well known in the display industry. A matte appearance provides enhanced viewing for the reader by lowering glare through the use of relatively larger particles, 1-10 micrometers, that provide "scattered reflection". This sort of product can be prepared without any AR function at all. However, the anti-glare (AG) character provided by these larger particles may be added to an antireflection (AR) construction by incorporation of the large (1-10 micron) particles either in the hardcoat layer or in the high index layer as described by Fuji, U.S. Pat. No. 6,693,746, herein incorporated by reference.

Surface modification of the nanoparticles relates to the reaction of specific molecules on the surface of particles, and is useful in achieving good dispersion or solubility within the polymer matrix, improved coating transparency, and improved coating durability. Relative to surface modifying nanoparticles, acrylate functionality is preferred over methacrylate functionality. On the other hand, methacrylate functionality is preferred over non-reactive, or nonpolymerizable, functionality.

The nanoparticles may also be treated with surface modifying agents such as carboxylic acids, silanes and/or dispersants to help compatibilize them with the polymer matrix. U.S. Pat. No. 6,329,058 exemplifies typical surface modifiers and is herein incorporated by reference. In essence, it is believed that surface modification prevents particle agglomeration thereby facilitating particle dispersion within the monomers and resins, and therefore enhancing the transparency of the coating formulation. Furthermore, the mixtures of the present invention contain high index nanoparticles thus enabling the formation of very thin but uniform coatings that may then be UV cured to form uniform high refractive index layers. Surface modification is also necessary for transparency and assist in easy particle dispersion in the monomers and resins. Surface modifier molecules exhibit a functionality that can covalently bond or adsorb to the particle surface. For example, carboxylic acid or silane functionality can covalently bond or adsorb to the particle surface and examples of these modifiers include methoxyethoxyethoxy-acetic acid (MEEAA) and A1230 (PEG-silane). The use of surface modifiers with high refractive index is also preferred and includes naphthyl acetic acid and trimethoxy phenyl silane.

The nanoparticles of the present invention may also be surface modified by reactive or copolymerizable surface modifiers. Reactive surface modification means that surface modifiers are employed that include functional groups that facilitate polymerization in addition to functionality that can either adsorb or covalently bond with the particle surface. When a coating of the present invention is polymerized (or cured), it forms a nanocomposite having particles covalently linked to the polymer matrix thus enhancing the durability of the cured coating. Examples of such modifiers are acrylic acid, methacrylic acid, and silanes with a radical polymerizable group, such as the preferred trimethoxysilylpropyl-methacrylate. When employing mixtures of nanoparticles, a combination of benefits may be realized. For example, surface modified zirconia may be added to raise the refractive index, while surface modified silica may be added to further enhance durability. It is preferred that the nanoparticles contain polymerizable surface modifiers, however, less than or equal to about 50% of the total amount of surface modifier may be composed of non-functional modifiers that can also be added and may be useful for nanoparticle dispersion in certain resins.

The composition of the present invention optionally comprises at least one photoinitiator. A single photoinitiator or blends thereof may be employed in the various films and/or coatings of the present invention. In general, the photoinitiator(s) are at least partially soluble (e.g. at the processing temperature of the resin) and substantially colorless after being polymerized. The photoinitiator may be (e.g. yellow) colored, provided that the photoinitiator is rendered substantially colorless after exposure to the UV light source.

Suitable photoinitiators, and preferably UV photoinitiators, include monoacylphosphine oxide and bisacylphosphine oxide. Commercially available mono or bisacylphosphine oxide photoinitiators include 2,4,6-trimethylbenzoydiphenylphosphine oxide, commercially available from BASF (Charlotte, N.C.) under the trade designation "Lucirin TPO"; ethyl-2,4,6-trimethylbenzoylphenyl phosphinate, also commercially available from BASF under the trade designation "Lucirin TPO-L"; and bis(2,4,6-trimethylbenzoly)-phenylphosphine oxide commercially available from Ciba Specialty Chemicals under the trade designation "Irgacure 819". Other suitable photoinitiators include 2-hydroxy-2-methyl-1-phenyl-propan-1-one, commercially available from Ciba Specialty Chemicals under the trade designation Daracur 1173. Other photoinitiators are commercially available under the tradenames "Darocur 4265", "Irgacure 651", "Irgacure 1800", "Irgacure 369", "Irgacure 1700", and "Irgacure 907". The photoinitiator is generally added at about 0.5 to 4 phr (part per hundred resin) to the resin composition. More or less can be employed depending on the requirements for color and cure speed, and other design criteria.

The polymerizable acrylate matrix will contain one or more crosslinking agents that are useful in the production of the crosslinked polymer component of the invention. The crosslinking agents are selected from a wide variety of di- or polyfunctional moieties which are capable of crosslinking monomer species. In general, the reactive functionalities which serve as active sites for such crosslinking are ethylenic functions, but other reactive and effective crosslinking functions are similarly useful as will be hereinafter described. The use of crosslinking agents in the formulation of polymers is well known to those skilled in the art, who similarly recognize that it is necessary for such agents to have at least two reactive functionalities.

The crosslinking agent may be formed as an ethylenically unsaturated monomer. The ethylenically unsaturated monomer is preferably a multifunctional ethylenically unsaturated ester of (meth)acrylic acid selected from the group consisting of a difunctional ethylenically unsaturated ester of acrylic or methacrylic acid, a trifunctional ethylenically unsaturated ester of acrylic or methacrylic acid, a tetrafunctional ethylenically unsaturated ester of acrylic or methacrylic acid, and combinations thereof. Of these, trifunctional and tetrafunctional ethylenically unsaturated esters of (meth)acrylic acid are more preferred.

Particularly preferred ethylenically unsaturated monomers have the formula:

wherein $R^1$ represents a member selected from the group consisting of hydrogen, halogen, and lower alkyl group, preferably having one to four carbon atoms, more preferably hydrogen or methyl; $R^2$ represents a polyvalent organic group having a molecular weight of 14 to 1000 and a valence of m+n; m represents an integer designating the number of acrylic: or methacrylic groups or both in the ester, preferably from 2 to 9, more preferably from 2 to 5, and where a mixture of acrylic or methacrylic monomers is used, preferably having an average value of 1.05 to 5; n represents an integer having a value of 1 to 5; and Y is selected from the group consisting of hydrogen, $C_1$-$C_5$ lower alkyl groups and protic functional groups, preferably selected from the group consisting of —OH, —COOH, —SO$_3$H,—SO(OH)$_2$, —PO(OH)$_2$, and oxazolidone. The polyvalent organic group $R^2$ can be cyclic or linear, branched, aromatic, aliphatic, or heterocyclic having nitrogen, nonperoxidic oxygen, sulfur, or phosphorus atoms. The acrylate ester monomers are employed in the coating at 20% to 80% by weight, more preferably at 30% to 70%. Examples of suitable multifunctional ethylenically unsaturated esters of (meth)acrylic acid are the polyacrylic acid or polymethacrylic acid esters of polyhydric alcohols including, for example, the diacrylic acid and dimethylacrylic acid ester of aliphatic diols such as ethyleneglycol,triethyleneglycol, 2,2-dimethyl-1,3-propanediol, 1,3-cyclopentanediol, 1-ethoxy-2,3-propanediol, 2-methyl-2,4-pentanediol, 1,4-cyclohexanediol, 1,6-hexamethylenediol, 1,2-cyclohexanediol, 1,6-cyclohexanedimethanol; the triacrylic acid and trimethacrylic acid esters of aliphatic triols such as glycerin, 1,2,3-propanetrimethanol, 1,2,4-butanetriol, 1,2,5-pentanetriol, 1,3,6,-hexanetriol, and 1,5,10-decanetriol; the triacylic acid and trimethacrylic acid esters of tris(hydroxyethyl)isocyanurate; the tetraacrylic and tetramethacrylic acid esters of aliphatic tetrols, such as 1,2,3,4-butanetetrol, 1,1,2,2,-tetramethylolethane, 1,1,3,3,-tetramethylolpropane, and pentaerythritol; the pentaacrylic acid and pentamethacrylic acid esters of aliphatic pentols such as adonitol; the hexaacrylic acid and hexamethacrylic acid esters of hexanols such as sorbitol and dipentaerythritol; the diacrylic acid and dimethacrylic acid esters of aromatic diols such as resorcinol, pyrocatechol, bisphenol A, and bis(2-hydroxyethyl) phthalate; the trimethacrylic acid ester of aromatic triols such as pyrogallol, phloroglucinol, and 2-phenyl-2,2-methyloletha-nol.

Preferably, for advantageous acid resistance, the multifunctional ethylenically unsaturated ester of (meth)acrylic acid is a nonpolyethereal multifunctional ethylenically unsaturated ester of (meth)acrylic acid. More preferably, the multifunctional ethylenically unsaturated ester of (meth)acrylic acid is selected from the group consisting of trimethylolpropane triacrylate, pentaerythritol triacrylate, pentaerythritol trimethacrylate, di-pentaerythritol pentacrylate and a combination thereof. Most preferably, the crosslinking monomer is pentaerythritol triacrylate. Pentaerythritol triacrylate (PETA) is commercially available from several sources including Sartomer of Sexton, Pa. under the trade designation "SR944"; from Osaka Organic Chemical Industry, Ltd. Of Osaka, Japan under the trade designation "Viscoat #300"; from Toagosei Co. Ltd., Tokyo, Japan under the trade designation "Aronix M-305"; and from Eternal Chemical Co., Ltd., Kaohsiung, Taiwan under the trade designation "SR351" and from Toagosei Co. Ltd. under the trade designation "Aronix M-309".

Preparation and/or requisition of the aforementioned crosslinkers is either described in the art, such as U.S. Pat. No. 4,396,476 (herein incorporated by reference) or commercially available. Exemplary suppliers include Sartomer Co. of Exton, Pa., and UCB Radcure of Smyrna, Ga.

Preferred ranges of zirconia are from about 25 to 75 wt %, and more preferably from about 40 to 60 wt % of the total composition. The resin matrix would then make up the complement of the composition, or, from about 75 to 25 wt %, and more preferably from about 60 to 40 wt %. The preferable level of crosslinker in the resin is from about 20 to 80 wt % of the total weight of the resin. The remainder of the resin is the aromatic sulfur acrylate, or, from about 80 to 20 wt % of the total weight of the resin.

Other additives known for their use in optical films may be included in the present compositions. For example, UV sensitizers, oxygen scavengers, and other components useful in free radical curing may be employed as known in the art. Other optional additives include antioxidants, UV absorbers, surfactants, other dispersants, colorants, pigments, and other particles, other photoinitiators, and other ingredients known in the art.

The invention is further illustrated, but not thereby limited, by the Examples given below.

EXAMPLE 1 a. The Synthesis of Acrylic Acid 2,2-Bis-(naphthalene-2-ylsulfanylmethyl)-propane-1,3-diol(1)

Equip a one-liter three-neck round bottom flask with a mechanical stirrer, condenser and temperature probe. To the flask is added 25 grams 2-thionaphthalene, 230 grams dimethylformamide, and 20.4 grams 2,2-bis(bromomethyl)-1,3-propanediol. Heat this mixture, with good agitation, to 75° C. To the stirred flask is added dropwise over about ½ hour 156 ml of 1 Molar potassium t-butoxide in 2-methyl-2-propanol. Once the addition is complete, hold the reaction at 75° C. for about ½ hour.

Cool the reaction to about 20° C., then use an external ice bath and to the flask add 560 grams water, keeping the pot temperature at 20-30° C. To the flask add 500 grams of ethyl acetate. Stir well and phase split. Remove the upper organic phase, then re-extract the aqueous phase with 300 grams of ethyl acetate. Wash the combined organic phase with a mixture of 300 grams water and 20 grams concentrated HCl. Wash the combined organic phase with a mixture of 300 grams water and 30 grams sodium chloride. Strip the solvent from the organic phase on a rotary-evaporator.

Recrystallize the resulting solid from two of the above reactions in 1400 grams toluene. Air dry the product. The yield of collected off-white solid is 48.0 grams (73%). The product has a mp of 121-125° C., and $^1$H and $^{13}$C NMR analysis confirms it is the desired product (1).

1 b. Synthesis of Acrylic Acid 2-acryloyloxymethyl-3-(naphthalene-2-ylsulfanyl)-2-(naphthalene-2-ylsulfanylmethyl)-propyl ester (2)

Equip a one-liter three-neck round bottom flask with a mechanical stirrer, condenser and temperature probe. To the flask is added 25 grams of the above intermediate (1), along with 250 grams dimethylformamide, 14.4 grams triethylamine, and 0.01 grams each of salicylaldoxime and tetramethyl phenylenediamine. Heat this mixture to 40° C. with good agitation. To the flask add 11.8 grams acryloyl chloride over about ½ hour, keeping the pot at about 40° C. Hold the reaction at 40° C. for one hour. Add three grams triethylamine to the flask, then add two grams acryloyl chloride dropwise. Hold the reaction at 40° C. for about one hour.

Cool the reaction to room temperature. To the flask add 430 grams water, then 520 grams ethyl acetate. Add five grams concentrated HCl and stir well, then phase split off the aqueous phase. Wash the organic phase with a mixture of 300 grams water and 30 grams sodium carbonate. Wash the organic phase with a mixture of 300 grams water and 30 grams sodium chloride. Strip the solvent on a rotary-evaporator to give an opaque light yellow liquid that turns to a semi-solid upon standing. The refractive index is 1.6490. $^1$H and $^{13}$C NMR analysis confirms it is >95% the desired product (2). The desired product 2 exhibited $^1$H NMR signals (d6-DMSO, TMS) at 3.4 ppm (—CH$_2$—S-Napth), 4.2 ppm (—CH$_2$—OAcr), 5.8, 6.0 and 6.2 ppm (acrylate olefinic protons), 7.4-7.5 ppm and 7.7-7.9 ppm (aromatic protons).

The desired product 2 exhibited $^{13}$C NMR signals (d6-DMSO, TMS) at 35.8.ppm (—CH$_2$—S-Napth), 43.3 ppm (pentaerythritol-skeleton quaternary carbon), 64.2 ppm (—CH$_2$—OAcr), 164.7 ppm (acrylate carbonyl), 131.2 ppm ("4a" quaternary carbon, tentative assignment), 133.2 ppm and 133.4 ppm (quaternary carbon ipso to sulfur and "8a" quaternary carbon; specific assignments not yet determined) and 125.8, 126.6 (2 C per napthyl ring), 126.9, 127.0, 127.5 (2 C per napthyl ring) and 128.4 ppm (remaining aromatic carbons).

2 c. Synthesis of 2,2-Bis-phenylsulfanylmethyl-propane-1,3-diol (3)

The synthesis was conducted as above, except using a stoichiometric equivalent of thiophenol rather than 2-thionaphthalene. The crude reaction mixture was worked up as described above to give a light brown oil. The yield was about 100%. The material was analyzed by $^1$H and $^{13}$C NMR and found to be about 60% of the desired intermediate (3). This material was used as is in the following step.

3 d. Synthesis of Acrylic Acid 2-acryloyloxymethyl-3-phenylsulfanyl-2-phenylsulfanylmethyl-propyl ester (4)

The synthesis was conducted as described above, except using a stoichiometric equivalent of intermediate (3) rather than intermediate (1). Obtain 69% yield of the acrylate monomer product as a light yellow oil. This material was analyzed by $^1$H and $^{13}$C NMR and found to be about 60% of the desired product.

A small sample of crude material (4) was purified by column chromatography using ethyl acetate and hexanes, with the desired product collected and the solvent removed on a rotary evaporator. This material was analyzed by $^1$H and $^{13}$C NMR and found to be >95% of the desired product (4). The refractive index was measured to be about 1.5837. The desired product (4) exhibited $^1$H NMR signals (CDCl$_3$, TMS) at 3.2 ppm (—CH$_2$—S—Ar), 4.2 ppm (—CH$_2$—OAcr), 5.8, 6.0, and 6.3 ppm (acrylate olefinic protons) and 7.2-7.4 ppm (aromatic protons).

The desired product (4) exhibited $^{13}$C NMR signals (CDCl$_3$, TMS) at 37.6 ppm (—CH$_2$—S—Ar), 43.9 ppm (pentaerythritol-skeleton quaternary carbon), 64.5 ppm (—CH$_2$—OAcr), 165.3 ppm (acrylate carbonyl), 136.1 pm (quaternary carbon ipso to sulfur), 129.0 and 130.5 ppm (2C each; aromatic methane carbons ortho- and meta- to sulfur substitution; specific assignments not determined), 126.8 ppm (aromatic methane carbon para- to sulfur substitution), 131.1 ppm (acrylate olefinic methylene), 127.7 ppm (acrylate olefinic methane; tentative assignment) and 126.8 ppm (aromatic methane carbon para- to sulfur; tentative assignment).

4

Figure 1:
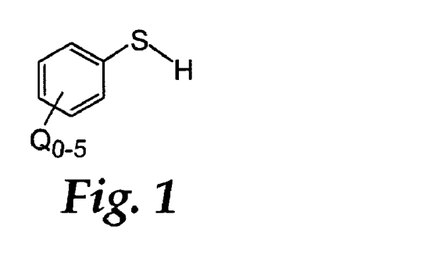
FIG. 1 structurally illustrates a phenyl class of aryl thio reagents.
Figure 2:
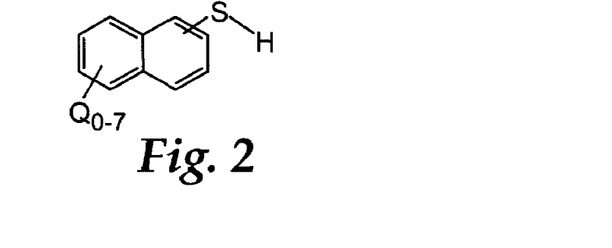
FIG. 2 structurally illustrates a naphthyl class of aryl thio reagents.

The above synthetic strategies may also incorporate substituted thiophenols and substituted thionaphthalenes. FIGS. 1 and 2 respectively exemplify these classes. Q in FIG. 8 is selected from the group including Br, F, Cl, or R or CF3, each of which may be present at 0-5 in any combination, and, wherein R is a group containing 1-6 carbons that may be straight or branched. Q in FIG. 2 is selected from the group including Br, F, Cl, or R or CF3, each of which may be present at 0-7 in any combination, and, wherein R is a group containing 1-6 carbons that may be straight or branched. Both classes exemplified in FIGS. 1 and 2 are commercially available from suppliers well known in the art. Exemplary substituted thiophenols include 2-bromothiophenol and 2-isopropylthiophenol, both available from the Aldrich Chemical Company of Milwaukee, Wis.

Relative to Example 1, and in yet another aspect of the invention, a method of forming an aromatic sulfur acrylate monomer, or a thio aromatic acrylate monomer, is described as follows, and as augmented by various reagents and process conditions, and their analogs, described in Example 1:

1. providing at least two moles of a thio aromatic compound;
2. providing at least one mole of a di-halogenated diol;
3. reacting the thio aromatic compound with the di-halogenated diol to form a di-thio aromatic diol;
4. providing at least two moles of acryloyl chloride and at least two moles of triethylamine; and
5. reacting the thio aromatic diol with reactive amounts of acryloyl chloride and triethylamine to form a di-thio aromatic di-acrylate monomer.

Other methods of forming the acrylate ester are well known to those practiced in the art, and are included generally in this description. Other aspects of the invention include thio aromatic acrylate monomers formed by the method given above, wherein preferred monomers include acrylic acid 2-acryloyloxymethyl-3-(naphthalene-2-ylsulfanyl)-2-(naphthalene-2-ylsulfanylmethyl)-propyl ester (2) and acrylic acid 2-acryloyloxymethyl-3-phenylsulfanyl-2-phenylsulfanylmethyl-propyl ester (4). Further aspects of the invention include hard coats and antireflective constructions comprising a thio aromatic acrylate produced by the method given above, and display systems comprising these hard coats and/or antireflective coatings produced from the method given above.

Related inventive aspects of the method of forming an aromatic sulfur acrylate include the monomers formed by the process, a hard coat containing the monomer, and a display system containing the hard coat formed with the monomer. Preferred embodiments of products formed from the method include acrylic acid 2-acryloyloxymethyl-3-(naphthalene-2-ylsulfanyl)-2-(naphthalene-2-ylsulfanylmethyl)-propyl ester (2) and acrylic acid 2-acryloyloxymethyl-3-phenylsulfanyl-2-phenylsulfanylmethyl-propyl ester (4).

EXAMPLE 2

Preparation of Surface Modified Zirconia Nanoparticles ZrO2 methacyloxypropyltrimethoxysilane Dialysis of ZrO2 Sol ZrO2 sol (207.4 g) was charged to a dialysis bag and dialyzed in 3500 g of de-ionized water for 6 hr. (sigma diagnostics tubing MWCO>1200 was used. The sol was isolated (34.03% solids) and used for the silane treatment.

The dialyzed ZrO2 sol (80 g, 34.03% solids, 30.8% ZrO2) was charged to a 16 oz jar. Water (80 g) was charged with stirring. Methoxypropanol (160 g), Methacryloxypropyl trimethoxy silane (8.59 g) was charged to a 500 ml beaker with stirring. The methoxypropanol mixture was then charged to the ZrO2 sol with stirring. The jar was sealed and heated to 90 C. for 3 hr 15 min. After heating the mixture was stripped to 170 g via rotary evaporation a white slurry was obtained.

De-ionized water (258 g) and Concentrated NH3 (5.7 g, 29 wt %) were charged to a one-liter beaker. The above concentrated sol was added to this with minimal stirring. The solids were isolated as a damp filter cake via vacuum filtration. The damp solids (82 g) were dispersed in methoxypropanol (200 g). The mixture was then concentrated (97 g) via rotary evaporation. Methoxypropanol (204 g) was added and the mixture concentrated (85.5 g) via rotary evaporation. Methoxypropanol was charged (205 g) and the mixture was concentrated via rotary evaporation. The final product 91.46 g was isolated at 27.4% solids. The mixture was filtered with a 1 um filter.

U.S. Pat. No. 7,241,437 describes exemplary zirconia particles and is hereby incorporated by reference. As known in the industry, Nalco and Buhler also provide zirconia particles in accordance with the present invention.

EXAMPLES 4-10

Each composition represented by Examples 4-10 in the table given below was dissolved in ethyl acetate and coated using a wire wound rod to a dry thickness of about 4 microns. They were dried for one minute in a 100° C. air circulating oven. They were then cured using a 500-watt Fusion UV processor at 20 ft/min using two passes. The zirconia was functionalized with methacrylate silane. The silica was also functionalized with methacrylate silane. 2-Naphthalene thio ethoxy acrylate (2-NSEA), is employed as an aromatic sulfur acrylate, and is made in a known manner.

Acrylic acid 2-(naphthalen-2-ylsulfanyl)-ethyl ester (6) is employed as an aromatic monofunctional sulfur acrylate monomer and is made as described below. The structure is also given below.

Synthesis of 2-(Naphthalen-2-ylsulfanyl)-ethanol (5)

Equip a twelve liter three neck round bottom flask with a temperature probe, mechanical stirrer and condenser. Add 2000 g. 2-thionaphthol, 4000 g. toluene, and 63.1 g. triethylamine. Using medium agitation, heat the batch to 95° C. To the reaction mixture add dropwise 1209 g. of melted ethylene carbonate. The batch evolves $CO_2$. The addition takes about three hours. At the conclusion of the addition, hold the reaction at 95° C. for about twelve hours. Cool the batch to room temperature. Gas chromatography indicates less than 1% residual 2-thionaphthol. Strip the solvent on a rotary evaporator to give the intermediate alcohol, which is a yellow oil that crystallizes upon standing. The yield is 1815 g. The melting point of this material is 61-63° C.

Synthesis of Acrylic Acid 2-(naphthalen-2-ylsulfanyl)-ethyl ester (6)

Equip a 250 ml. three neck round bottom flask with a temperature probe, mechanical stirrer and condenser. To the flask add 50 g. of the above intermediate, 29.7 g. triethylamine, 0.01 grams each of salicylaldoxime and tetramethyl phenylenediamine and 430 g. of t-butylmethyl ether. Heat the mixture to 40° C. and add 24.4 g. acryloyl chloride dropwise to the reaction. Hold the reaction at 40° C. for one hour. GC shows the reaction to have no residual starting material. Cool the reaction to room temperature. To the flask add 400 grams water. Add five grams concentrated HCl and stir well, then phase split off the aqueous phase. Wash the organic phase with a mixture of 300 grams water and 30 grams sodium carbonate. Wash the organic phase with a mixture of 300 grams water and 30 grams sodium chloride. Strip the solvent on a rotary-evaporator to give a yellow oil. The yield is 50 g. The refractive index of this monomer (6) is 1.6209.

The desired product 6 exhibited $^{13}C$ NMR signals (d6-DMSO, TMS) at 32.0 ppm (—$CH_2$—S-Napth), 62.9 ppm (—$CH_2$—OAcr), 165.7 ppm (acrylate carbonyl), and 125.8, 126.6(2C per napthyl ring), 126.9, 127.0, 127.5 (2 C per napthyl ring) and 128.4 ppm (remaining aromatic carbons).

Acrylic acid 2-{4-[4-(2-acryloyloxy-ethylsulfanyl)-phenylsulfanyl]-phenylsulfanyl}-ethyl ester is employed as an aromatic sulfur acrylate. Pentaerythritol tri and tetraacrylate mixture (SR 295) is employed as a crosslinker. Daracur 4265 and TPO were employed as photoinitiators and are available from well known suppliers thereof. For example, TPO and Daracure 4265 are photoinitiators available from Ciba-Geigy of Tarrytown, N.Y.

Abrasion Resistance was run using a modified Oscillating Sand Method (ASTM F 735-94). An orbital shaker was used (VWR DS-500E, from VWR Bristol, Conn.). The sample was placed in a 16 oz. jar (W216922 from Wheaton, Millville, N.J.) covered with 50 grams of 20-30 mesh Ottawa sand (VWR, Bristol, Conn.). The shaker was set at 400 rpm for one hour. The haze of the sample was measured before and after testing using a Lambda 900 Spectrophotometer (Perkin Elmer, Shelton, Conn.) in diffuse transmission mode 450 nm. The difference in before and after haze is recorded as the abrasion of the sample. The refractive index was measured with a Metricon™ refractometer.

TABLE 1

| Ex | Zirc. | Si | SR295 | acrylic acid 2-{4-[4-(2-acryloyloxy-ethylsulfanyl)-phenylsulfanyl]-phenylsulfanyl}-ethyl ester (8) | acrylic acid 2-(naphthalen-2-ylsulfanyl)-ethyl ester (6): | P.I. % | RI | Abrasion |
|---|---|---|---|---|---|---|---|---|
| 4 |  | 50 | 25 | 25 |  | Dar 4265 4 | 1.537 | 2.2 |
| 5 | 50 |  | 25 | 25 |  | Dar 4265 4 | 1.641 | 1.7 |
| 6 | 60 |  |  |  | 40 | Dar 4265 2 |  | 7.7 |
| 7 | 60 |  | 40 |  |  | Dar 4265 2 |  | 1.5 |
| 8 | 60 |  | 15 |  | 25 | Dar 4265 2 |  | 1.6 |
| 9 | 50 |  | 50 |  |  | TPO 3.3 | 1.593 | 3.0 |
| 10 | 50 |  | 17 |  | 33 | TPO 3.3 | 1.658 | 2.8 |

As shown in Table 1, the examples indicate that all three components, functionalized zirconia, acrylate crosslinker, and aromatic sulfur acrylate are required to produce durable high index hard coats. Examples 4 and 5 indicate that zirconia is required for a high refractive index coating and that when it is combined with the acrylate crosslinker and aromatic sulfur acrylate it gives similar durability to silica. Example 6 indicates that having just the aromatic sulfur acrylate combined with the zirconia results in poor durability. On the other hand, combining the zirconia and the crosslinker and aromatic sulfur acrylate (Example 8) results in similar durability to that resulting from zirconia combined with the crosslinker (Example 7). Most importantly, Examples 9 and 10 indicates that replacing part of the crosslinker with the aromatic sulfur acrylate (Example 10) provides similar durability but higher refractive index compared to just the crosslinker and the zirconia (Example 9).

EXAMPLE 11

Figure 3:
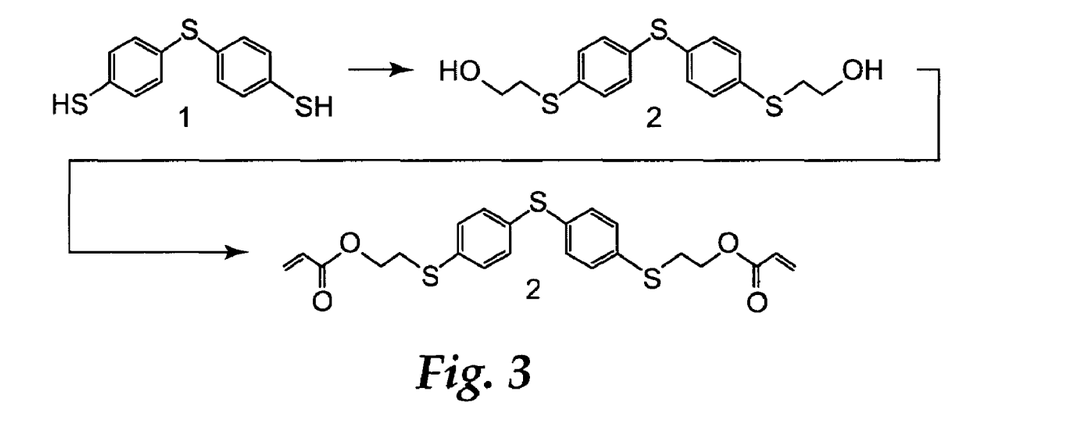
FIG. 3 structurally illustrates the formation of acrylic acid 2-{4-[4-(2-acyloyloxy-ethylsulfanyl)-phenylsulfanyl]-phenylsulfanyl}-ethyl ester.

The synthesis of acrylic acid 2-{4-[4-(2-acryloyloxy-ethylsulfanyl) -phenylsulfanyl]-phenylsulfanyl}-ethyl ester (8) as shown in FIG. 3.

A mixture containing 15 grams of 4,4'-Thiobisbenzenethiol (1), 11.6 grams of ethylene carbonate, and 0.6 grams of triethylamine in 30 ml of toluene was heated at 90° C. for four hours. The mixture was recrystallized from 10 percent ethylacetate in toluene to give 13.2 grams of 2-{4-[4-(2-hydroxy-ethylsulfanyl}-phenylsulfanyl]-phenylsulfanyl}-ethanol (7).

7

A solution containing 13 grams of (7) and 14.9 grams of diisopropylethylamine was cooled to 5° C., and to it was added 10.4 grams of acryloyl chloride over a period of 20 minutes. The mixture was stirred at 5-10° C. for two hours after which it was poured into a mixture containing 75 ml of 1N HCL and 100 ml of ethyl acetate. After stirring for five minutes the organic phase was removed and washed with saturated KCl solution followed by 10 percent aqueous potassium bicarbonate. The solvent was removed and the residue purified on column chromatography (silica gel eluted with 25% ethylacetate/hexane) to yield in the first fraction 8.5 grams of (8).

The desired product 8, formed by the method of Example 11, exhibited 1H NMR signals (CDCl3, TMS) at 3.2 ppm [—CH2-alpha to sulfur], 4.3 ppm [—CH2-alpha to oxygen], 5.8 ppm and 6.4 ppm [olefinic methylene; cis- and trans-protons, respectively], 6.1 ppm [olefinic methine] and 7.26 and 7.32 ppm [aromatic methine protons].

The desired product 8 exhibited 13C NMR signals (CDCl3, TMS) at 32.1 ppm [—CH2-alpha to sulfur], 62.8 ppm [—CH2-alpha to oxygen], 128.0 ppm [acrylate olefinic methine], 130.2 and 131.5 ppm [aromatic methine carbons], 131.3 ppm [acrylate olefinic methylene], 133.7 and 134.5 ppm [aromatic ring carbons ipso- to sulfur] and 165.8 ppm [acrylate carbonyl].

8

EXAMPLE 12

Figure 4:
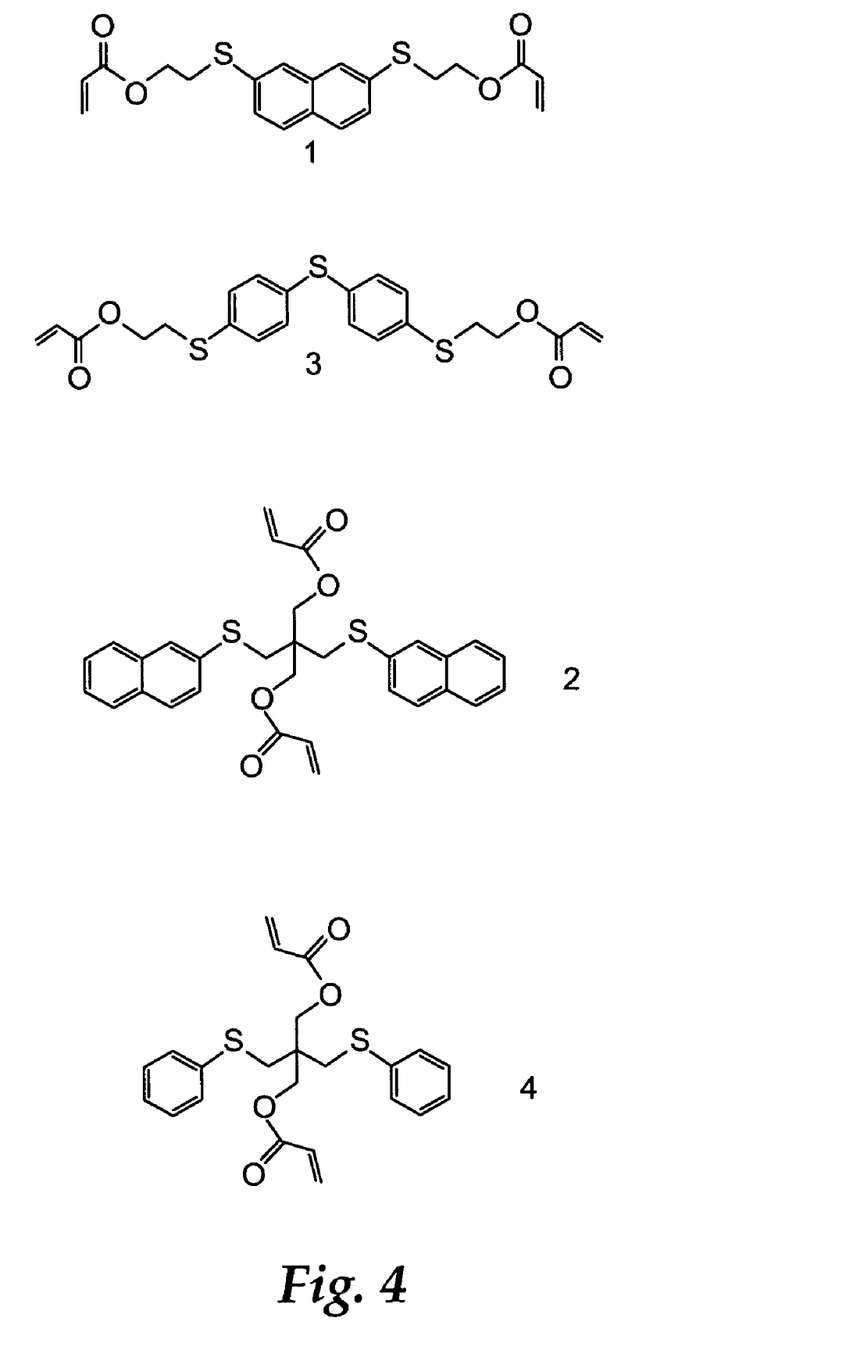
FIG. 4 structurally illustrates preferred embodiments of the present invention.

The synthesis of acrylic acid acrylic acid 2-[7-(2-acryloyloxy -ethylsulfanyl)-naphthalen-2-ylsulfanyl]-ethyl ester (11), (11) being shown in FIG. 4.

To a mixture containing 32 grams of 2,7-dihydroxynaphthalene and 26.3 grams of potassium hydroxide in 140 ml of water which had been cooled to 10° C. was slowly added 56.8 grams of dimethylthiocarbamoyl chloride in 88 ml of tetrahydrofuran. The temperature was maintained below 12° C. throughout the addition. The solid which formed was filtered, washed with water, reslurried in methanol and filtered to produce 50.2 grams of dimethyl-thiocarbamic acid O-(7-dimethylthiocarbamoyloxy-naphthalen-2-yl) ester. After drying this was placed in a round bottom flask and heated under a nitrogen atmosphere at 250° C. for 1.5 hours. The mixture was cooled and the solid recrystallized from ethyl acetate to give 17 grams of dimethyl-thiocarbamic acid S-(7-dimethylcarbamolysulfanyl-naphthalen-2-yl) ester. This was added to a mixture of 50 ml of ethanol and a solution of 22.4 grams of potassium in 32 mil of water, and then heated at reflux for 30 minutes. The mixture was cooled, diluted with 300 ml of water and acidified with hydrochloric acid. The solid which formed was filtered and dried yielding 8.5 grams of naphthalene-2,7-dithiol (9).

9

A mixture containing 5.4 grams of naphthalene-2,7-dithiol (9), 5.4 grams of ethylene carbonate and 0.26 grams of triethylamine in 20 ml of toluene was heated to 90° C. for four hours. The mixture was cooled and the solid removed by filtration. The solid was recrystallized from ethyl acetate to yield 5.3 grams of 2-[7-2-hydroxy-ethylsulfanyl) -naphthalen-2-ylsulfanyl]-ethanol (10).

10

A mixture containing 5.2 grams of (10) and 7.2 grams of diisopropylethylamine in 40 ml of tetrahydrofuran was cooled to 5° C. and to it was added five grams of acryloyl chloride. The mixture was stirred at this temperature for two hours after which it was poured into a mixture containing 75 ml of 1N HCl and 100 ml of ethyl acetate. After stirring for five minutes the organic phase was separated and washed with saturated potassium chloride solution followed by 10 percent potassium carbonate. The solvent was removed and the residue purified by column chromatography on silica gel eluted 25 percent ethyl acetate in hexane to yield in the first fraction 2.6 grams of (11).

The desired product (11), formed by the method of Example 12, exhibited $^1$H NMR signals (CDCl$_3$, TMS) at 5.8 ppm, 6.1 ppm, and 6.4 ppm (acrylic olefinic protons), 7.4 and 7.7 ppm (aromatic ring methines in 3-, 4-, 5-, and 6-positions of naphthalene ring system), and 7.75 ppm (aromatic ring methines in 1- and 8-positions of naphthalene ring system).

The desired product (11) exhibited $^{13}$C NMR signals (CDCl$_3$, TMS) at 165.8 ppm (acrylate carbonyl), 134.0 ppm (quaternary ring carbon at ring junction between 4- and 5-position), 133.8 ppm (quaternary ring carbon ipso to sulfur), 131.3 ppm (acrylate olefinic methylene), 130.3 ppm (quaternary ring carbon at ring junction between 1- and 8-position) and 128.4 ppm, 128.0 ppm, 127.3 ppm, and 126.5 ppm (naphthalene ring methines and acrylate olefinic methine).

11

It is believed that the method given above may be used to prepare other naphthalenic isomers of (11) simply by appropriately selecting the starting naphthalene diol and following the same method.

TABLE 2

| Ex | Zirc. wt % | Si | SR295 wt % | Resin wt % | P.I. wt % Irg 907 | Abrasion | RI |
|---|---|---|---|---|---|---|---|
| 15 | 48 | | 48 | 0 | 4 | 1.7 | 1.592 |
| 16 | 48 | | 24 | 24 acrylic acid 2-(naphthalen-2-ylsulfanyl)-ethyl ester (6): | 4 | 1.8 | 1.644 |
| 17 | 48 | | 24 | 24 acrylic acid 2-[7-(2-acryloyloxy-ethylsulfanyl)-naphthalen-2-ylsulfanyl]-ethyl ester (11) Ex. 12 | 4 | 2.2 | 1.634 |
| 18 | 48 | | 24 | 24 acrylic acid 2-{4-[4-(2-acryloyloxy-ethylsulfanyl)-phenylsulfanyl]-phenylsulfanyl}-ethyl ester (8) Ex. 11 | 4 | 2.1 | 1.637 |
| 19 | 48 | | 24 | 24 acrylic acid 2-acryloyloxymethyl-3-(naphthalene-2-ylsulfanyl)-2-(naphthalene-2-ylsulfanylmethyl)-propyl ester (2). Ex. 1b | 4 | 2.3 | 1.663 |
| 20 | 48 | | 24 | 24 acrylic acid 2-acryloyloxymethyl-3-phenylsulfanyl-2-phenylsulfanylmethyl-propyl ester (4). Ex. 1d | 4 | | 1.609 |

Thin films can be applied using a variety of techniques, including dip coating, forward and reverse roll coating, wire wound rod coating, and die coating. Die coaters include knife coaters, slot coaters, slide coaters, fluid bearing coaters, slide curtain coaters, drop die curtain coaters, and extrusion coaters among others. Many types of die coaters are described in the literature such as by Edward Cohen and Edgar Gutoff, *Modern Coating and Drying Technology*, VCH Publishers, N.Y. 1992, ISBN 3-527-28246-7 and Gutoff and Cohen, *Coating and Drying Defects: Troubleshooting Operating Problems*, Wiley Interscience, N.Y. ISBN 0-471-59810-0.

A die coater generally refers to an apparatus that utilizes a first die block and a second die block to form a manifold cavity and a die slot. The coating fluid, under pressure, flows through the manifold cavity and out the coating slot to form a ribbon of coating material. Coatings can be applied as a single layer or as two or more superimposed layers. Although it is usually convenient for the substrate to be in the form of a continuous web, the substrate may also be formed to a succession of discrete sheets.

The wet film is dried in an oven to remove the solvent and then subjected to ultraviolet radiation using an H-bulb or other lamp at a desired wavelength, preferably in an inert atmosphere (less than 50 parts per million oxygen). The reaction mechanism causes the multifunctional component of the acrylate phase to covalently crosslink with the thio acrylate monomer phase. The resultant film as a high index hardcoat optical coating for example, thus constitutes a co-crosslinked polymer network having a thickness of about 2-8 microns, and more preferably about 3-6 microns. It would be possible to use this composition in thinner layers in an AR construction in the range of about 75-130. Accordingly, the thickness of the film may range from as small as 0.05 microns to as much as eight or more microns depending on its application. As one of ordinary skill will appreciate, the film thickness may vary depending upon the desired light reflectance/absorbency characteristics in conjunction with the desired durability characteristics.

Other known techniques of preparing multilayer films include spin coating, knife coating, and the like. U.S. Pat. No. 6,737,154, herein incorporated by reference, exemplifies one method of manufacturing a multilayer polymeric film. The methods of forming a multilayer film construction are known in the art and therefore, further comment is not necessary.

Figure 5:
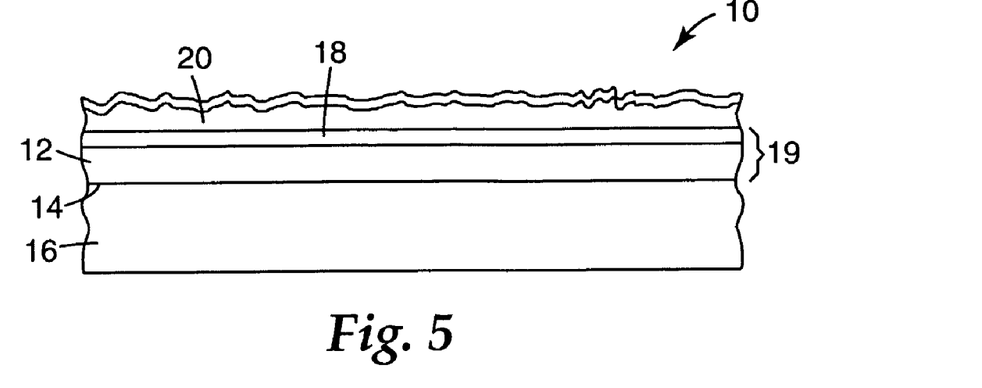
FIG. 5 illustrates an antireflective coating construction containing an optical coating, in accordance with the present invention.
Figure 6:
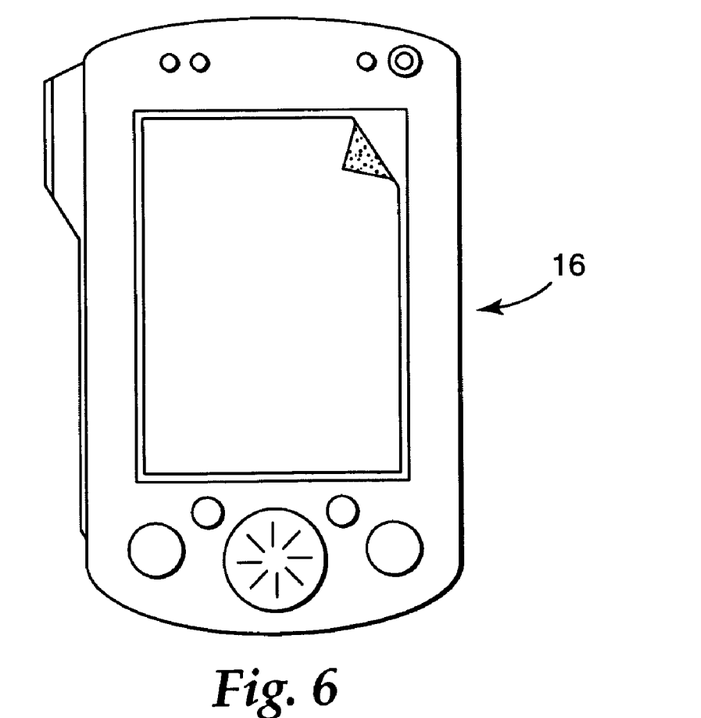
FIG. 6 illustrates a typical display device in accordance with the present invention.

In yet another aspect of the invention, the high index hard coats described above are generally included within a film construction, and more preferably within an antireflective film construction. As shown in FIGS. 5 and 6, a coating 10 (preferably an antireflective coating) contains a substrate 12 formed from PET or polycarbonate, or any other material recognized for its utility as a substrate in antireflective films. The substrate 12 is coupled to a display device 16 and also to a juxtaposed layer outwardly oriented from the substrate 12. An optional adhesive 14 may be employed to adhesively couple the resin substrate 12 to the display device 16. In accordance with the present invention, a high index hardcoat layer 18 is coupled to and layered over substrate 12 thereby forming an outwardly oriented layer in physical contact with substrate 12. In yet another aspect of the invention, the hardcoat layer 18 also functions as a high index layer typically forming a separate layer in the AR construction and having a relatively high refractive index of at least 1.55 and more preferably 1.58. As such, the need for a separate high index layer is obviated given that the hardcoat layer provides the durability and high index normally achieved by two discrete high index and hard coat layers. A thin low index layer 20, having a refractive index of 1.5 or less, is next optionally coupled to and/or layered over hardcoat layer 18.

The low index layer 20 may be formed as known in the art. U.S. Pat. No. 6,723,423 exemplifies the known understanding of forming a low refractive index layer and is herein incorporated by reference, although not by way of limitation. An exemplary low index layer may be formed from low refractive index fluoropolymer compositions and derived from an interpenetrating polymer network or semi-interpenetrating polymer network which includes a reactive fluoroplastic and/or a fluoroelastomer (i.e. the functional fluoropolymer phase) blended with multi-functional acrylates (i.e. the acrylate phase) such as trimethylolpropane triacrylate (TMPTA) and optionally additional fluorinated mono-functional acrylates or multi-functional fluorinated acrylates which can be coated and cured by ultraviolet light or by thermal means. The presence of an acrylate crosslinker provides a composition with both low refractive index and improved adhesion to high index polymer substrates such as polyethylene terephthalate ("PET") or hard coated PET films. The low index coating mixture preferably describes a reactive high molecular weight fluoropolymer(s) that can participate in the crosslinking reactions between the monomeric multi-functional acrylates. This enhances the crosslinkability of the fluoropolymer phase to the forming polyacrylate phase and produces a co-crosslinked, interpenetrating or semi-interpenetrating polymer network with enhanced interfacial contact between the high index layer and the low index layer and thereby improves durability and low refractive index.

Various permanent and removable grade adhesive compositions 14 may be coated on the opposite side of the substrate 12 (i.e. to that of the hardcoat 18) so the article 10 can be easily mounted to a display surface. Typically, the adhesive 14, substrate 12, and hard coating layer 18 are prepackaged as a film 19 having a release layer (not shown) attached to the adhesive 14. The release layer is then removed and the adhesive layer 14 coupled to a housing or other area of the display 16 to form the optical display 16.

Suitable adhesive compositions 14 include (e.g. hydrogenated) block copolymers such as those commercially available from Kraton Polymers, Westhollow, Tex. under the trade designation "Kraton G-1657", as well as other (e.g. similar) thermoplastic rubbers. Other exemplary adhesives include acrylic-based, urethane-based, silicone-based and epoxy-based adhesives. Preferred adhesives are of sufficient optical quality and light stability such that the adhesive does not yellow with time or upon weather exposure so as to degrade the viewing quality of the optical display. The adhesive can be applied using a variety of known coating techniques such as transfer coating, knife coating, spin coating, die coating and the like. Exemplary adhesives are described in U.S. patent application publication No. 2003/0012936, herein incorporated by reference. Several of such adhesives are commercially available from 3M Company, St. Paul, Minn. under the trade designations 8141, 8142, and 8161. The substrate layer 12 may consist of any of a wide variety of non-polymeric materials, such as glass, or polymeric materials, such as polyethylene terephthalate (PET), bisphenol A polycarbonate, cellulose triacetate, poly(methyl methacrylate), and biaxially oriented polypropylene which are commonly used in various optical devices.

It is contemplated that the present invention will find primary application in optical coatings and films including anti-reflective film, for example. However, it is not limited thereto. Furthermore, the present invention includes all positional isomers and homologs of the various constituents of the present invention. It will further be understood that the foregoing description of an embodiment of the present invention is for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A display system comprising a hard coat layer coupled to a substantially transparent substrate, the hard coat layer comprising:
   functionalized zirconia nanoparticles;
   at least one acrylate crosslinking agent; and
   at least one aromatic sulfur acrylate monomer selected from the group of compounds defined by the following formula:

where $R1=H$ or $CH_3$, m,n,p, and q are independently 1-6, and Ar is any aromatic group.

2. The display system of claim 1 wherein said acrylate crossliniking agent is multifunctional and said aromatic sulfur acrylate exhibits an index of refraction of at least 1.58 or greater.

3. The display system of claim 1 wherein said aromatic sulfur acrylate is selected from the group consisting of acrylic acid 2-acryloyloxymethyl-3-(naphthalene-2-ylsulfanyl)-2-(naphthalene-2-ylsulfanylmethyl)-propyl ester and acrylic acid 2-acryloyloxymethyl-3 -phenylsulfanyl-2-phenylsulfanylmethyl-propyl ester.

4. The display system of claim 1 further comprising a low refractive index layer coupled to said hardcoat layer.

5. The display system of claim 4 wherein said low refractive index layer has a refractive index no greater than 1.5.

6. The display system of claim 4 wherein said hardcoat layer has a refractive index of at least 1.58.

7. The display system of claim 1 wherein the hard coat layer further comprises a photoinitiator.

8. The display system of claim 1 wherein said hard coat has an abrasion resistance no greater than 3.0% haze as determined by modified ASTM F 735-94.

9. The display system of claim 1 wherein the hard coat layer comprises a multifunctional acrylate with a functionality of at least 3.

10. The display system of claim 9 wherein said multifunctional acrylate is pentaerythritol triacrylate.

11. A coating composition comprising:
   an aromatic sulfur acrylate selected from the group of compounds defined by the following formula:

where R1=H or CH$_3$, m,n,p, and q are independently 1-6, and Ar is any aromatic group;

an acrylate crossliniker; and functionalized zirconia nanoparticles.

12. The composition of claim 11 wherein said zirconia nanoparticles have a diameter measuring about 10-30 nanometers.

* * * * *

UNITED STATES PATENT AND TRADEMARK OFFICE
CERTIFICATE OF CORRECTION

PATENT NO. : 7,491,441 B2
APPLICATION NO. : 11/026573
DATED : February 17, 2009
INVENTOR(S) : Richard J. Pokorny It is certified that error appears in the above-identified patent and that said Letters Patent is hereby corrected as shown below:

Column 1
Line 58-59, Delete "2-{4-[4-(2-acyloyloxy-ethylsulfanyl) and insert --2-{4-[4-(2-acryloyloxy-ethylsulfanyl)--, therefor.

Column 2
Line 66, Delete "CH3" and insert --$CH_3$--, therefor.

Column 4
Line 61-62, Delete "trimethylbenzoydiphenylphosphine" and insert --trimethylbenzoyldiphenylphosphine--, therefor.
Line 66-67, Delete "trimethylbenzoly)" and insert --trimethylbenzoyl)--, therefor.

Column 9
Line 41, Delete "CF3" and insert --$CF_3$--, therefor.
Line 45, Delete "CF3" and insert --$CF_3$--, therefor.

Column 10
Line 27, Delete "ZrO2" and insert --$ZrO_2$--, therefor.
Line 31, Delete "ZrO2" and insert --$ZrO_2$--, therefor.
Line 32, Delete "ZrO2" and insert --$ZrO_2$--, therefor.
Line 36, Delete "ZrO2" and insert --$ZrO_2$--, therefor.
Line 41, Delete "ZrO2" and insert --$ZrO_2$--, therefor.
Line 41-42, Delete "90 C." and insert --90° C.--, therefor.
Line 44, Delete "NH3" and insert --$NH_3$--, therefor.

Column 12
Line 42, Delete "mode 450" and insert --mode at 450--, therefor.

Column 13
Line 17-18, Delete "ethylsulfanyl) -phenylsulfanyl]" and insert --ethylsulfanyl)-phenylsulfanyl]--, therefor.
Line 47, Delete "HCL" and insert --HCl--, therefor.
Line 55, Delete "CDCl3" and insert --$CDCl_3$--, therefor.
Line 56, Delete "CH2" and insert --$CH_2$--, therefor.
Line 62, Delete "CDCl3" and insert --$CDCl_3$--, therefor.
Line 62, Delete "CH2" and insert --$CH_2$--, therefor.

UNITED STATES PATENT AND TRADEMARK OFFICE
CERTIFICATE OF CORRECTION

PATENT NO. : 7,491,441 B2
APPLICATION NO. : 11/026573
DATED : February 17, 2009
INVENTOR(S) : Richard J. Pokorny It is certified that error appears in the above-identified patent and that said Letters Patent is hereby corrected as shown below:

Column 14
Line 29-30, Delete "(7-dimethylcarbamolysulfanyl" and insert --(7-dimethylcarbamoylsulfanyl--, therefor.

Column 18
Line 37, In Claim 2, delete "crossliniking" and insert --crosslinking--, therefor.
Line 56, In Claim 8, delete "coat has" and insert --coat layer has--, therefor.

Column 20
Line 5, In Claim 11, delete "crossliniker" and insert --crosslinker--, therefor.

Signed and Sealed this

Twentieth Day of October, 2009

David J. Kappos
*Director of the United States Patent and Trademark Office*